United States Patent
Lin et al.

(10) Patent No.: US 6,981,230 B1
(45) Date of Patent: Dec. 27, 2005

(54) ON-CHIP POWER-GROUND INDUCTANCE MODELING USING EFFECTIVE SELF-LOOP-INDUCTANCE

(75) Inventors: Shen Lin, Foster City, CA (US);
Norman Chang, Fremont, CA (US);
Weize Xie, Cupertino, CA (US);
Richard Chou, Cupertino, CA (US)

(73) Assignee: Apache Design Solutions, Inc., Palo Alto, CA (US)

( * ) Notice: Subject to any disclaimer, the term of this patent is extended or adjusted under 35 U.S.C. 154(b) by 67 days.

(21) Appl. No.: 10/209,081

(22) Filed: Jul. 30, 2002

(51) Int. Cl.$^7$ ............................................. G06F 17/50
(52) U.S. Cl. ............................. 716/1; 716/11; 716/12; 703/14
(58) Field of Search ........................... 703/14; 702/65; 716/1, 4, 7, 12, 2, 11; 331/197

(56) References Cited

U.S. PATENT DOCUMENTS

| | | | |
|---|---|---|---|
| 5,326,932 A | 7/1994 | You | |
| 5,694,344 A | 12/1997 | Yip et al. | |
| 6,453,444 B1 * | 9/2002 | Shepard | 716/2 |
| 6,523,150 B1 * | 2/2003 | Buffet et al. | 716/4 |
| 2002/0107647 A1 * | 8/2002 | Anderson et al. | 702/65 |
| 2002/0163396 A1 * | 11/2002 | Lim et al. | 331/179 |

OTHER PUBLICATIONS

Gala, Kaushik, et al., *On-Chip Inductance Modeling and Analysis*, Annual ACM IEEE Design Automation Conference, Proceedings of the 37$^{th}$ conference on Design Automation, 2000, pp. 63-68, ACM Press, New York, NY, USA, ISBN: 1-58113-187-9.

* cited by examiner

Primary Examiner—Thuan Do
(74) Attorney, Agent, or Firm—Blakely, Sokoloff, Taylor & Zafman LLP (57) ABSTRACT

An efficient inductance modeling approach for on-chip power-ground wires using their effective self-loop-inductances is disclosed. Instead of extracting the inductive coupling between every two parallel wires and putting this huge number inductance elements into circuit simulation, this technique determines the effective self-loop-inductance for each power or ground wire segment and only generates a circuit with these effective self-inductors for simulation. This approach greatly reduces the circuit size and makes the full-chip power-ground simulation with the consideration of inductance feasible.

24 Claims, 3 Drawing Sheets

ON-CHIP POWER-GROUND INDUCTANCE MODELING USING EFFECTIVE SELF-LOOP-INDUCTANCE

FIELD OF THE INVENTION

The present invention relates to the field of integrated circuit (IC) simulation; more particularly, the present invention relates to performing modeling of on-chip power-ground inductance using the effective self-loop inductance.

BACKGROUND OF THE INVENTION

A sudden change of the current flowing through a wire may induce abrupt voltage changes on that wire and its neighboring wires due to inductance. If these wires are part of the on-chip power-ground network, the induced voltage fluctuation is called Delta-I noise. (In mathematics, Delta represents time derivative so Delta-I refers to di/dt.) The Delta-I noise is equal to L di/dt, where L is a matrix of self- and mutual-inductances and i is a vector of currents on Power-ground wires. In circuits, the current spikes are caused by gate switching; therefore, a chip's di/dt measure can be defined as $$\frac{di}{dt} \sim \frac{I}{\tau} = \frac{I\, V_{dd}}{\tau V_{dd}} = \frac{P}{\tau V_{dd}} \sim \frac{P\, f_c}{V_{dd}}, \quad \text{(Eq. 1)}$$

where I is the total average current flowing into the chip, P is the chip's power consumption, and τ is the typical rise-time of a gate, which multiplied by the chip operating frequency $f_c$ should normally be a constant, and Vdd is the voltage supplied to the chip.

A general IC design trend is that the chip power P continues to increase because of denser circuits and aggressively higher operating frequency $f_c$. Also $V_{dd}$ is constantly decreased to save power. Therefore, if this is the case, then the di/dt value should be constantly increasing. One % Delta-I noise measure is as follows:

$$\%\,\text{Delta} - I = \frac{L\frac{di}{dt}}{V_{dd}} \sim \frac{L\, P\, f_c}{V_{dd}^2} \quad \text{(Eq. 2)}$$

Thus, the on-chip inductance is increasing with the constant shrink of wire width while the package inductance is only slightly decreasing. Moreover, with the introduction of lower resistivity metals, such as copper, to boost a chip's performance, the impact of the wires' inductive impedance may become compatible with the resistive portion if not larger. With all these trends, it is easy to see that the Delta-I noise will be very significant in the near future. Circuit designers have to verify and simulate their chips while considering the chips' Power-ground inductance, i.e. the matrix L.

However, due to the long range effect of partial inductive coupling, which decreases at logarithmic speed with spacing, the dimension of the L matrix can be huge and every off-diagonal mutual-coupling term is not small compared to diagonal partial self-inductance terms. This means that every two non-orthogonal wires of the Power-ground network couples to each other. Furthermore, simply ignoring smaller terms in L matrix may render the L matrix into a non-positive matrix, generating energy along with the circuit simulation and causing an incorrect simulation result.

Therefore, up until now, Power-ground simulation with the consideration of inductance and inductive coupling has been a big challenge. Researchers used Susceptance (the inverse of L matrix) or improved linear system solvers hoping to speed-up simulation but never succeeded in catching up with the increase of the number of Power-ground wires. Even if only the top two layer Power-ground wires are considered, the number of wire segments in parallel may easily go up to tens of thousands. For example, in a regular N-by-N P/G mesh, the dimension of L increases at $N^4$.

SUMMARY OF THE INVENTION

A method and apparatus is disclosed herein for calculating effective self loop inductance for on-chip power and ground wire segments in an integrated circuit (IC) design; modeling each of the wire segments in the IC design using a self-inductor representing its calculated self-loop inductance of said each wire segment; and simulating noise of the IC design using the self-loop inductors to represent associated wire segments.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

An efficient inductance modeling approach for on-chip power-ground wires using their effective self-loop-inductances is disclosed. Instead of extracting the inductive coupling between every two parallel wires and inserting this large number of inductance elements into circuit simulation, the techniques herein determine the effective self-loop-inductance for each power and ground wire segment and only generates a circuit with these effective self-inductors for simulation. This approach greatly reduces the circuit size and makes the full-chip power- ground simulation with the consideration of inductance feasible.

This approach overcomes the difficulties of the prior art. That is, by using this effective-self-loop inductance of each wire segment, there is no mutual term in L to be included in the circuit for simulation. The modeling of each power-ground wire segment is an inductor with only self-inductance and resistance so the circuit size is greatly reduced and hence, the full- chip power-ground simulation becomes feasible.

In one embodiment, a simulator generates the effective self-loop-inductance for each power or ground wire segment takes into account all inductive couplings from other parallel ground or power wires. Therefore in order to verify or simulate Delta-I noises, each on-chip power or ground wire segment may be modeled by only a self-inductor of its self-loop- inductance.

In wire-bumped or periphery-bumped chips, to determine the effective self-loop- inductance of a power or ground wire segment, a current loop is assumed to flow from that power or ground wire segment and return back from its nearest ground or power wire segments with their total cross-sectional area equal to 1 to 5 times the cross-sectional area of the power or ground wire segment.

In area-bumped or C4 chips, to determine the effective self-loop-inductance of a power or ground wire segment, a current loop is assumed to flow from that power or ground wire segment and return back from its nearest ground or power planes or mesh at the package and nearest ground and power wire segments with their total cross-sectional area equal to 0.2 to 2 times the cross-sectional area of the power or ground wire segment. In this context, the term "plane" means solid power or ground planes, while the term "mesh" means orthogonal power and ground wires interleaving to form a mesh.

To achieve improved accuracy, a power or ground segment may be partitioned into multiple sub-segments. The effective self-loop-inductance of each may be sub-segment calculated as set forth herein. Then, the original power or ground wire segment may be modeled by a serial combination of the K effective self-loop inductors.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine- readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Effective-Self-Loop-Inductance

With requests to on-chip power-ground wires, only high-frequency current components matter for the Delta-I noise because the di/dt value increases with the rate of change of i. (The current i may be decomposed into Fourier series and the high frequency components are those Fourier terms at high frequency.) Therefore, the techniques described herein focus is on high frequency components.

Furthermore, most power or ground wire segments are sandwiched by orthogonal wires in immediate below and/or above layers with strong capacitive coupling. In an IC chip, each metal layer is specified in a preferred routing direction. Those directions are alternating between adjacent layers. These orthogonal wires and capacitive coupling provide AC current return paths from a power/ground wire segment to its neighboring ground/power wire segments.

Moreover, the magnetic flux induced by the current at a wire will be confined at a smaller that becomes even smaller region as frequency increases. For a particular wire, good AC return paths exist, such as those mentioned above, most of the high frequency components should return currents only at the neighboring wires around that particular wire.

In view of the above, although the inductive coupling may extend to those wires far away, most high frequency return currents occur only at neighboring wires. With good accuracy, the focus need only be on these small current loops while determining Delta-I noise. In other words, for a power wire segment, those ground wire segments within a small region around it are considered for possible high frequency return. This small region is defined in more detail below. This isolates the inductance extraction into small regions. Then, the loop-inductance is calculated by using this return assumption. One half of the resulting loop-inductance is defined as the effective self-loop-inductance. The inductance modeling for power-ground segments is only composed of these self-inductors. Before the effective self-loop-inductance determination technique is discussed thoroughly, the inductance screening rule is described. Because many on-chip power-ground wire segments are narrow and thin and hence, very resistive, their inductance effect may be ignored.

Inductance Screening

Let $f_c$ be the chip's operating frequency. Normally, only the electrical effects induced by those frequency components up to 10 $f_c$ are considered, where $f_c$ is defined as the significant frequency $f_s$. The significant angular frequency $\omega_s = 2\pi f_c$. Let R and L be the per-unit-length resistance and self-partial inductance of a power-ground wire segment, respectively. A screening rule is defined as follows: if $\omega_s L > \alpha R$, the wire segment's inductance may not be ignored and should be part of a AC return path. These wire segments are defined as inductive wire segments. The constant $\alpha$ may range from 0.2 to 0.8, depending on the accuracy requirement. The smaller the number of wires identified as inductive, the more accurate. By employing this screening rule, many non-inductive power-ground wires may be screened out from the inductance and inductive coupling consideration, which speeds up the extraction and simulation processes.

Effective Self-Loop-Inductance for Wire-bumped and Periphery-Bumped Chips

Figure 1:
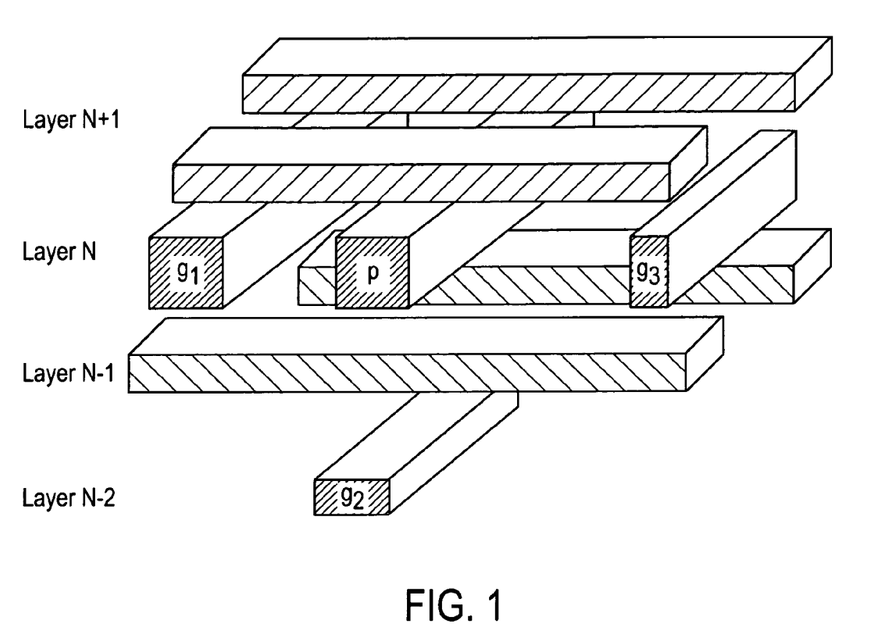
FIG. 1 illustrates a typical power wire segment and the ground wire segment in parallel around it after the above mentioned inductance screening.

Depending on different IC packaging styles, different considerations may be needed. In wire-bumped or periphery-bumped chips, power or ground pads are placed around the chip boundary. Even with good AC return on the package or PCB, such as sufficient de-coupling capacitors inserted on the package or PCB, in the worst case, switching currents need to travel from the power pad at the chip boundary to the hot spots on chip then back to the ground pad at the chip boundary and then through the package or PCB AC return back to the starting power pad. As chips get bigger, this return path has significant inductance and resistance. Since this path's impedance is usually large, it is assumed that most AC returns happen on chip. FIG. 1 shows a typical power wire segment p and the ground wire segment $g_i$ in parallel around it after the above mentioned inductance screening. As shown, p is on metal layer N. Layer N+1 and Layer N−1 are in the orthogonal direction. Layer N may be the top layer of metal in this chip. In that case, there is no Layer N+1. Let the cross-section area of p be A and let $g_1 \ldots g_N$ be the nearest ground wire segments with their total area immediately larger than $\beta A$, where $\beta$ is a constant ranges from 1.0 to 5.0. The larger the number of $g_i$ segments included, the more accurate. It is assumed that the current at p returns at those segment $g_i$ with very good accuracy. Segment p and $g_i$ may be of different length and start at different locations. Therefore, the effective self-loop-inductance determination of a power segment p is defined as follows.

Effective Self-Loop-Inductance of a Power Segment p

The following is one embodiment of a process for determining the effective self- loop-Inductance of a Power Segment. The process is performed by processing logic that may comprise hardware, software, or a combination of both.

Let A be the cross-sectional area (p's width times p's thickness) of p, which starts at point x and ends at point y.

Let $x_i$, i=1 . . . K be those points at p at which the wire structure changes, where $x_1$=x and $X_K$=y. That is, at a point $x_i$, some ground wire segments come in and some drop out of the picture. Since this may cause implementation difficulty, a fixed length approach is used by setting $x_i=(y-x)/\Delta$, where $\Delta$ is a constant ranging from 10 u to 500 u, depending on how often the structure may change (as the calculation occurs all along the model) and the accuracy requirement. The smaller the number, the more accurate.

$$\text{FOR } x_i = x_1 \text{ to } X_{K-1} \quad (3)$$

Let $g_1 \ldots g_N$ be the ground wire segments overlapped with p at $x_i$ sorted according to their distances to p, i.e. $g_1$ is the nearest ground wire segment. (A segment g overlapped with p means that a plane P perpendicular to p at $x_i$ will cut through g. Distance means that at this plane P the two dimensional distance from that cut through point to $x_i$.)

Set total_A=0

$$\text{FOR } i=1 \ldots N \text{ by } 1 \quad (6)$$

total_A=total_A+area of $g_i$

If total_A>$\beta$A then M=i; go to 10.

end For at (6)

Determine the per-unit-length loop inductance of the 2D-structure comprising the M+1 wires, p and $g_1 \ldots g_M$, at a frequency f, ranging from 0.2 $f_s$ to 50 $f_s$, assuming the current flowing from p and returning back from $g_1 \ldots g_M$. In one embodiment, using the frequency $f_s$=f is performed. Let this loop inductance be $L^1_{loop}$. (This loop inductance may be determined by using the Partial-Element-Equivalent-Circuit or PEEC method, employed in inductance extraction tools like FastHenry and Raphael RI3. The segments p and $g_1 \ldots g_M$ are assumed to extend by certain length l, ranging from 10 u to 1000 u. The far ends of those wires are merged together and the near ends of $g_1 \ldots g_M$ are merged together, denoted by node REF (i.e., the voltage on both eds is the same, so the current doesn't change). The per-unit-length loop inductance $L^i_{loop}$ is the inductance from the near end of p to REF divided by l. Although the length l and the frequency f may be selected in the mentioned range, in one embodiment, the choice is length l=500 u and frequency $f=f_s$.)

The effective self-loop-inductance for p from point $x_i$ to point $x_{i+1}$ is $$\frac{\|x_{i+1} - x_i\| L^i_{loop}}{2}$$

end FOR at 3 (3)

The effective self-loop-inductance for p $$\sum_{i=1}^{K-1} \frac{\|x_{i+1} - x_i\| L^i_{loop}}{2}$$

Effective Self-Loop-Inductance of a Ground Segment g

The following is one embodiment of a process for determining the effective self- loop-Inductance of a ground Segment g. The process is performed by processing logic that may comprise hardware, software, or a combination of both.

Let A be the cross-sectional area of g, which starts at point x and ends at point y. Let $x_i$, i=1 . . . K be those points at g, at which the wire structure changes, where $x_1$=x and $X_K$=y. That is at a point $x_i$, some power wire segments may have to be added to the determination while others may be dropped. Since this may cause implementation difficulty, a fixed length approach is used by setting $x_i=(y-x)/\Delta$, where Δ is a constant ranging from 10 u to 500 u, depending on how often the structure may changes (as the calculation occurs all along the model) and accuracy requirement. The smaller, the more accurate.

$$FOR\ x_i = x_1\ to\ x_{K-1} \quad (3)$$

Let $p_1 \ldots p_N$ be the power wire segments overlapped with g at $x_i$ sorted according to their distances to g, i.e. $p_1$ is the nearest ground wire segment. (A segment p over- lapped with g means that a plane P perpendicular to g at $x_1$ will cut through p. Distance means that at this plane P, the two dimensional distance from that cut through point to $x_i$.)

Set total_A=0

$$FOR\ i=1\ldots N\ by\ 1 \quad (6)$$

total_A=total_A+area of $p_i$
If total_A>βA then M=i; go to 10.
end For at (6)

Determine the per-unit-length loop inductance of the 2D-structure comprising the M+1 wires, g and $p_1 \ldots P_M$, at a frequency f, ranging from 0.2 $f_s$ to 50 $f_s$, assuming the current flowing from g and returning back from $p_1 \ldots P_M$. In one embodiment, using the frequency $f_s = f$ is preferred. Let this loop inductance be L $L^i_{loop}$. (This loop inductance may be determined by using the Partial-Element-Equivalent-Circuit or PEEC method, employed in inductance extraction tools like FastHenry and Raphael RI3. The segments g and $p_1 \ldots P_M$ are assumed to extend by certain length l, ranging from 10 u to 1000 u. The far ends of those wires are merged together and the near ends of $p_1 \ldots p_M$ are merged together, denoted by node REF. The per-unit-length loop inductance $L^l_{loo}$ is the inductance from the near end of g to REF divided by l. Although the length l and the frequency f may be selected in the mentioned range, in one embodiment, l=500 u and f=$f_s$.)

The effective self-loop-inductance for g from point $x_i$ to point $x_{i+1}$ is $$\frac{\|x_{i+1} - x_i\| L^i_{loop}}{2}$$

end FOR at (3)
The effective self-loop-inductance for g $$\sum_{i=1}^{K-1} \frac{\|x_{i+1} - x_i\| L^i_{loop}}{2}$$

Effective Self-Loop-Inductance for Area-bumped Flipped Chips

Figure 2:
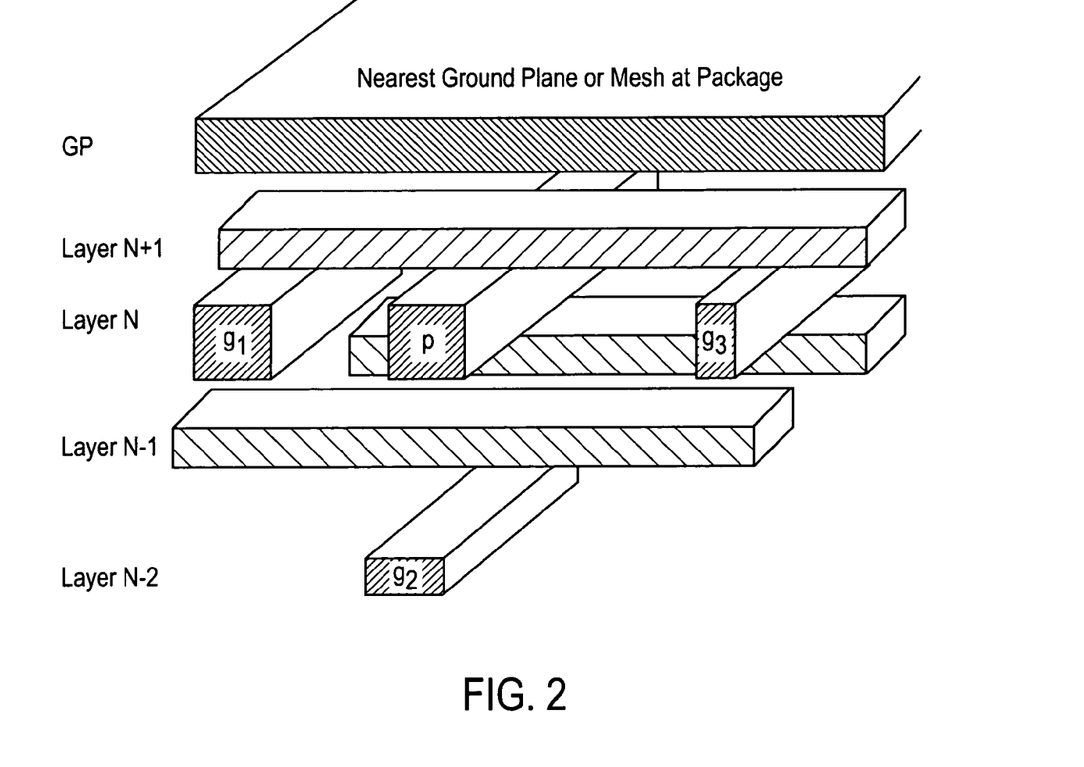
FIG. 2 illustrates a typical power wire segment and the ground wire segment in parallel around it after the inductance screening and the nearest ground plane or mesh in the package.

In area-bumped flipped chips or C4 bump technology, power or ground pads are distributed among the top level of metal. Since the density of power or ground pads is high, most switching currents may return through the package when good AC return on the package, such as through on-package de-coupling capacitors, are provided. Since these paths' impedance is usually small, it is assumed that most AC returns are through package. Therefore, the package power-ground network is taken into account. The package power-ground network usually is composed of planes or meshes. Since most magnetic flux may not penetrate a plane or a mesh, only the nearest plane or mesh to the IC die is considered. FIG. 2 shows a typical power wire segment p and the ground wire segment $g_i$ in parallel around it after the inductance screening and the nearest ground plane or mesh GP in the package. As shown, p is on metal layer N. Layer N+1 and Layer N−1 are in the orthogonal direction. Layer N may be the top layer of metal. In that case, there is no Layer N+1. Let the cross-section area of p be A and let $g_1 \ldots g_N$ be the nearest ground wire segments with the total area immediately larger than βA, where β is a constant ranges from 0.5 to 2.0, depending on the accuracy requirement. In one embodiment, β is 1. The larger, the more $g_i$ and the more accurate. It is assumed that the current at p returns at those segment $g_1$ and the plane/mesh GP with very good accuracy. Segment p and $g_i$ may be of different length and start at different locations. Therefore, the effective self-loop-inductance determination of a power segment p is defined as follows. Note the constant β here is much smaller than that used in the self-loop-inductance for wire-bumped and periphery-bumped chips described above.

Effective Self-Loop-Inductance of a Power Segment p

Let A be the cross-sectional area of p, which starts at point x and ends at point y, and GP be the nearest ground plane or mesh at package to p.

Let be those points at p, at which the wire structure changes, where $x_1 = x$ and $X_K = y$. That is at a point $x_i$, some ground wire segment come in and some drop out of the picture. Since this may cause implementation difficulty, a fixed length approach is used by setting $x_i = (y-x)/\Delta$, where Δ is a constant ranging from 10 u to 500 u, depending on how often the structure may changes and accuracy requirement.

$$FOR\ x_i = x_1\ to\ X_{K-1} \quad (3)$$

Let $g_1 \ldots g_N$ be the ground wire segments overlapped with p at $x_i$ sortedaccording to their distances to p, i.e., $g_1$ is the nearest Ground wire segment. (A segment g over-lapped with p means that a plane P perpendicular to p at x, will cut through g. Distance means that at this plane P, the two dimensional distance from that cut through point to $x_i$.)

Set total_A=0

$$FOR\ i=1\ldots N\ by\ 1 \quad (6)$$

total_A=total_A+area of $g_i$
If total_A>βA then M=i; go to 10.
end For at (6)

Determine the per-unit-length loop inductance of the 2D-structure comprising the M+1 wires, p and $g_1 \ldots g_M$, and the plane/mesh GP at a frequency f, ranging from 0.2 $f_s$ to 50 $f_s$, assuming the current flowing from p and returning back from $g_1 \ldots g_1 \ldots g_M$. Let this loop inductance be $L^i_{loop}$. (This loop inductance may be determined by using the Partial- Element-Equivalent-Circuit or PEEC method, employed in inductance extraction tools like FastHenry and Raphael RI3. The segments p and $g_1 \ldots g_M$ and GP are assumed to extend by certain length l, ranging from 10 u to 1000 u. If GP is a solid plane, it is approximated by a mesh of bars of filaments. The far ends of those wires and GP are merged together and the near ends of $g_1 \ldots g_M$ and GP are merged together, denoted by node REF. The per-unit-length loop inductance $L^i_{loop}$ is the inductance from the near end of p to REF divided by l. Although the length l and the frequency f may be selected in the mentioned range, the best choice is l=500 u and f=$f_s$.)

The effective self-loop-inductance for g from point $x_i$ to point $x_{i+1}$ is $$\frac{\|x_{i+1}-x_i\|L^i_{loop}}{2}$$

end FOR at (3)

The effective self-loop-inductance for g $$\sum_{i=1}^{K-1}\frac{\|x_{i+1}-x_i\|L^i_{loop}}{2}$$

Effective Self-Loop-Inductance of a Ground Segment g

The following is one embodiment of a process for determining the effective self- loop-Inductance of a ground Segment g. The process is performed by processing logic that may comprise hardware, software, or a combination of both.

Let A be the cross-sectional area of g, which starts at point x and ends at point y, and PP be the nearest Power plane or mesh at package to g. Let $x_{i,\ i=1}$. K be those points at g, at which the wire structure changes, where $x_1 = x$ and $x_K = y$. That is at a point $x_1$, some power wire segment come in and some drop out of the picture. Since this may cause implementation difficulty, a fixed length approach is used by setting $x_1=(y-x)/\Delta$, where $\Delta$ is a constant ranging from 10 u to 500 u, depending on how often the structure may changes and accuracy requirement.

FOR $x_i = x_1$ to $x_{K-1}$ (3)

Let $p_1 \ldots P_N$ be the power wire segments overlapped with g at $x_i$ sorted according to their distances to g, i.e. p 1 is the nearest Ground wire segment. (A segment p overlapped with g means that a plane P perpendicular to g at $x_i$ will cut through p. Distance means that at this plane P the two dimensional distance from that cut through point to $x_i$.)

Set total_A=0

FOR i=1 ... N by 1 (6)

total_A=total_A+area of $p_i$

If total_A>βA then M=i; go to 10.

end For at (6)

Determine the per-unit-length loop inductance of the 2D-structure comprising the M+1 wires, g and $p_1 \ldots P_M$, and PP at a frequency f, ranging from 0.2 f, to 50 $f_s$, assuming the current flowing from g and returning back from $p_1 \ldots P_M$ and PP. Let this loop inductance be $L^i_{loop}$. (This loop inductance may be determined by using the Partial-Element-Equivalent-Circuit or PEEC method, employed in inductance extraction tools like FastHenry and Raphael RI3. The segments g and $p_1 \ldots P_M$ and PP are assumed to extend by certain length l, ranging from 10 u to 1000 u. The far ends of those wires and PP are merged together and the near ends of $p_1 \ldots P_M$ are merged together, denoted by node REF. The per-unit-length loop inductance $L^i_{loop}$ is the inductance from the near end of g to REF divided by l. Although the length l and the frequency f may be selected in the mentioned range, in one embodiment, l= 500 u and f=$f_s$ are used.)

The effective self-loop-inductance for g from point $x_i$ to point $x_{i+1}$ is $$\frac{\|x_{i+1}-x_i\|L^i_{loop}}{2}$$

end FOR at (3)

The effective self-loop-inductance for g $$\sum_{i=1}^{K-1}\frac{\|x_{i+1}-x_i\|L^i_{loop}}{2}$$

An Exemplary Computer System

Figure 3:
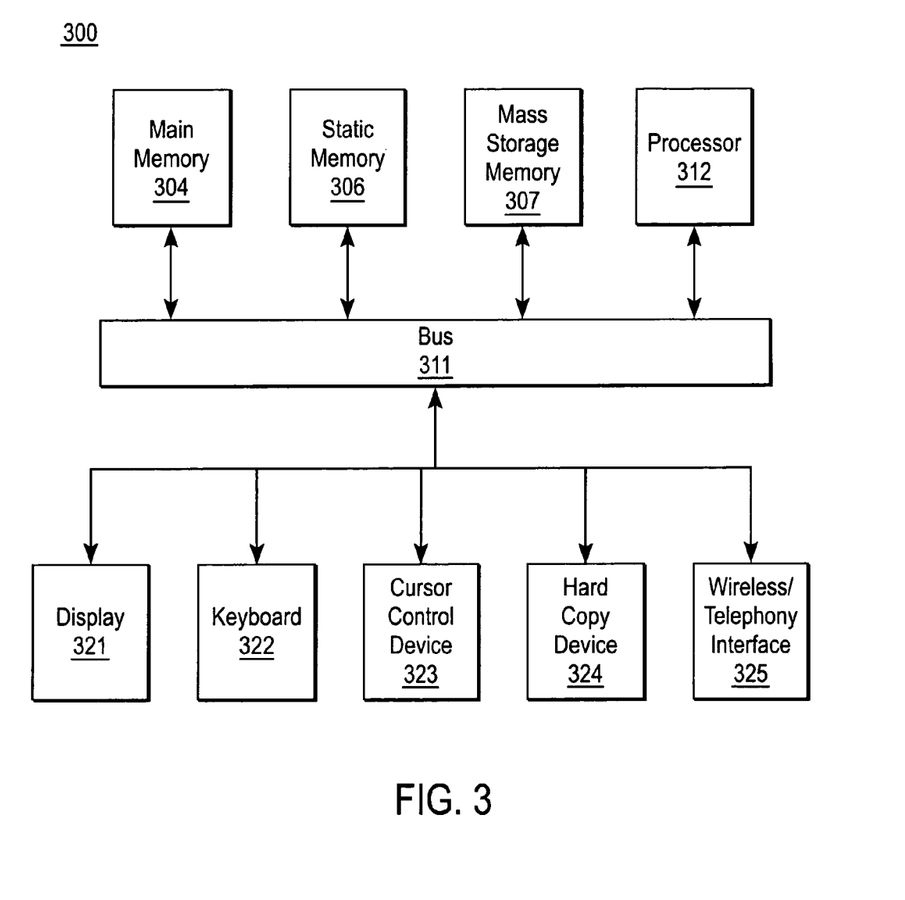
FIG. 3 illustrates one embodiment of a computer system.

FIG. 3 is a block diagram of an exemplary computer system that may be used to perform one or more of the operations described herein. Referring to FIG. 3, computer system 1000 may comprise an exemplary client 1050 or server 1000 computer system in which the features of the present invention may be implemented. Computer system 1000 comprises a communication mechanism or bus 1011 for communicating information, and a processor 1012 coupled with bus 1011 for processing information. Processor 1012 includes a microprocessor, but is not limited to a microprocessor, such as Pentium™, PowerPC™, Alpha™, etc.

System 1000 further comprises a random access memory (RAM), or other dynamic storage device 1004 (referred to as main memory) coupled to bus 1011 for storing information and instructions to be executed by processor 1012. Main memory 1004 also may be used for storing temporary variables or other intermediate information during execution of instructions by processor 1012.

Computer system 1000 also comprises a read only memory (ROM) and/or other static storage device 1006 coupled to bus 1011 for storing static information and instructions for processor 1012, and a data storage device 1007, such as a magnetic disk or optical disk and its corresponding disk drive. Data storage device 1007 is coupled to bus 1011 for storing information and instructions.

Computer system 1000 may further be coupled to a display device 1021, such as a cathode ray tube (CRT) or liquid crystal display (LCD), coupled to bus 1011 for displaying information to a computer user. An alphanumeric input device 1022, including alphanumeric and other keys, may also be coupled to bus 1011 for communicating information and command selections to processor 1012. An additional user input device is cursor control 1023, such as a mouse, trackball, trackpad, stylus, or cursor direction keys, coupled to bus 1011 for communicating direction information and command selections to processor 1012, and for controlling cursor movement on display 1021.

Another device which may be coupled to bus 1011 is hard copy device 1024, which may be used for printing instructions, data, or other information on a medium such as paper, film, or similar types of media. Furthermore, a sound recording and playback device, such as a speaker and/or microphone may optionally be coupled to bus 1011 for audio interfacing with computer system 1000. Note that any or all of the components of system 1000 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    calculating effective self loop inductance for on-chip power wire segments and on-chip ground wire segments in an integrated circuit (IC) design, wherein calculating effective self-loop inductance is performed under an assumption that a current loop exists from each of the power or ground wire segments to its nearest respective ground or power wire segments with a total cross-sectional area of wire segments in the current loop equal to 1–5 times cross-sectional area of one or more of its nearest wire segments;
    modeling each of the wire segments in the IC design using a self-inductor representing its calculated self-loop inductance of said each wire segment; and
    simulating noise of the IC design using the self-loop inductors to represent associated wire segments.

2. The method defined in claim 1 wherein the noise comprises Delta-I noise.

3. The method defined in claim 1 wherein the design is for a wire-bumped chip.

4. The method defined in claim 1 wherein the design is for a periphery-bumped chip.

5. A method comprising:
    calculating effective self loop inductance for on-chip power wire segments and on-chip ground wire segments in an integrated circuit (IC) design, wherein calculating effective self-loop inductance is performed under an assumption that a current loop exists from each of the power or ground wire segments to its nearest respective ground or power plane or mesh at a package specified in the IC design with a total cross-sectional area of wire segments in the current loop equal to 0.2–2 times cross-sectional area of the one or more of its nearest wire segments;
    modeling each of the wire segments in the IC design using a self-inductor representing its calculated self-loop inductance of said each wire segment; and
    simulating noise of the IC design using the self-loop inductors to represent associated wire segments.

6. The method defined in claim 5 wherein the IC design is for an area-bumped chip.

7. The method defined in claim 5 wherein the IC design is for an C4 chip.

8. A method comprising:
    calculating effective self loop inductance for on-chip power wire segments and on-chip ground wire segments in an integrated circuit (IC) design;
    modeling each of the wire segments in the IC design using a self-inductor representing its calculated self-loop inductance of said each wire segment;
    simulating noise of the IC design using the self-loop inductors to represent associated wire segments;
    partitioning at least one of the power or ground wire segments into a plurality of sub-segments;
    calculating effective self-loop inductance for each of the plurality of sub-segments; and
    modeling the at least one wire segment via a serial combination of the calculated effective self-loop inductances of the plurality of sub-segments.

9. An apparatus comprising:
    means for calculating effective self loop inductance for on-chip power and ground wire segments in an integrated circuit (IC) design, wherein means for calculating effective self-loop inductance is performed under an assumption that a current loop exists from each of the power or ground wire segments to its nearest respective ground or power wire segments specified in the IC design with a total cross-sectional area of wire segments in the current loop equal to 1–5 times cross-sectional area of one or more of its nearest wire segments;
    means for modeling each of the wire segments in the IC design using a self-inductor representing its calculated self-loop inductance of said each wire segment; and
    means for simulating noise of the IC design using the self-loop inductors to represent associated wire segments.

10. The apparatus defined in claim 9 wherein the noise comprises Delta-I noise.

11. The apparatus defined in claim 9 wherein the design is for a wire-bumped chip.

12. The apparatus defined in claim 9 wherein the design is for a periphery-bumped chip.

13. An apparatus comprising:
    means for calculating effective self loop inductance for on-chip power and ground wire segments in an integrated circuit (IC) design, wherein means for calculating effective self-loop inductance is performed under an assumption that a current loop exists from each of the power or ground wire segments to its nearest respective ground or power planes or mesh at a package specified in the IC design with a total cross-sectional area of wire segments in the current loop equal to 02–2 times cross-sectional area of its nearest wire segments;
    means for modeling each of the wire segments in the IC design using a self-inductor representing its calculated self-loop inductance of said each wire segment; and
    means for simulating noise of the IC design using the self-loop inductors to represent associated wire segments.

14. The apparatus defined in claim 13 wherein the IC design is for an area-bumped chip.

15. The apparatus defined in claim 13 wherein the IC design is for an C4 chip.

16. An apparatus comprising:
    means for calculating effective self loop inductance for on-chip power and ground wire segments in an integrated circuit (IC) design;
    means for modeling each of the wire segments in the IC design using a self-inductor representing its calculated self-loop inductance of said each wire segment;
    means for simulating noise of the IC design using the self-loop inductors to represent associated wire segments;
    means for partitioning at least one of the wire segments into a plurality of sub-segments;
    means for calculating effective self-loop inductance for each of the plurality of sub- segments; and
    means for modeling the at least one wire segment via a serial combination of the calculated effective self-loop inductances of the plurality of sub-segments.

17. An article of manufacture comprising a computer readable medium having computer readable code stored thereon, which, when executed by a system, causes the system to:

calculate effective self loop inductance for on-chip power and ground wire segments in an integrated circuit (IC) design, wherein calculating effective self-loop inductance is performed under an assumption that a current loop exists from each of the power or ground wire segments to its nearest respective ground or power wire segments specified in the IC design with a total cross-sectional area of wire segments in the current loop equal to 1-5 times cross-sectional area of one or more of its nearest wire segments;

model each of the wire segments in the IC design using a self-inductor representing its calculated self-loop inductance of said each wire segment; and simulate noise of the IC design using the self-loop inductors to represent associated wire segments.

18. The article defined in claim 17 wherein the noise comprises Delta-I noise.

19. The article defined in claim 17 wherein the design is for a wire-bumped chip.

20. The article defined in claim 17 wherein the design is for a periphery-bumped chip.

21. An article of manufacture comprising a computer readable medium having computer readable code stored thereon, which, when executed by a system, causes the system to:

calculate effective self loop inductance for on-chip power and ground wire segments in an integrated circuit (IC) design, wherein calculating effective self-loop inductance is performed under an assumption that a current loop exists from each of the power or ground wire segments to its nearest respective ground or power planes or mesh at a package specified in the IC design with a total cross-sectional area of wire segments in the current loop equal to 0.2–2 times cross-sectional area of the one or more of its nearest wire segments;

model each of the wire segments in the IC design using a self-inductor representing its calculated self-loop inductance of said each wire segment; and simulate noise of the IC design using the self-loop inductors to represent associated wire segments.

22. The article defined in claim 21 wherein the IC design is for an area-bumped chip.

23. The article defined in claim 21 wherein the IC design is for an C4 chip.

24. An article of manufacture comprising a computer readable medium having computer readable code stored thereon, which, when executed by a system, causes the system to:

calculate effective self loop inductance for on-chip power and ground wire segments in an integrated circuit (IC) design;

model each of the wire segments in the IC design using a self-inductor representing its calculated self-loop inductance of said each wire segment;

simulate noise of the IC design using the self-loop inductors to represent associated wire segments;

partition at least one of the wire segments into a plurality of sub-segments;

calculate effective self-loop inductance for each of the plurality of sub-segments; and model the at least one wire segment via a serial combination of the calculated effective self-loop inductances of the plurality of sub-segments.

* * * * *